Figure 1:
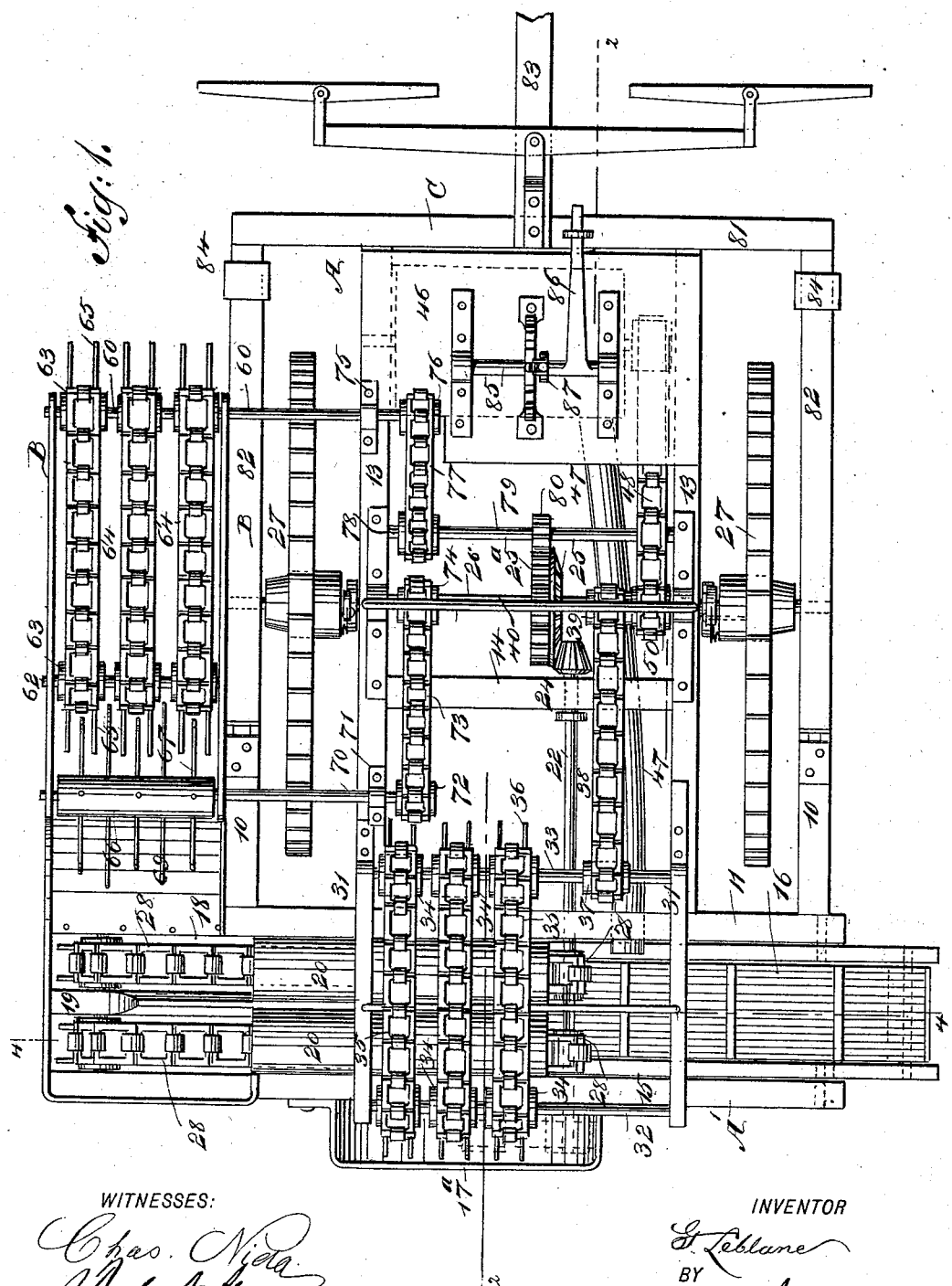

(No Model.) 4 Sheets—Sheet 1.

G. LEBLANC.
CORN HARVESTER AND HUSKER.

No. 539,774. Patented May 21, 1895.

WITNESSES:
Chas. Nida
J. Ack Acker

INVENTOR
G. Leblanc
BY
Munn & Co
ATTORNEYS.

(No Model.) 4 Sheets—Sheet 2.
G. LEBLANC.
CORN HARVESTER AND HUSKER.
No. 539,774. Patented May 21, 1895.
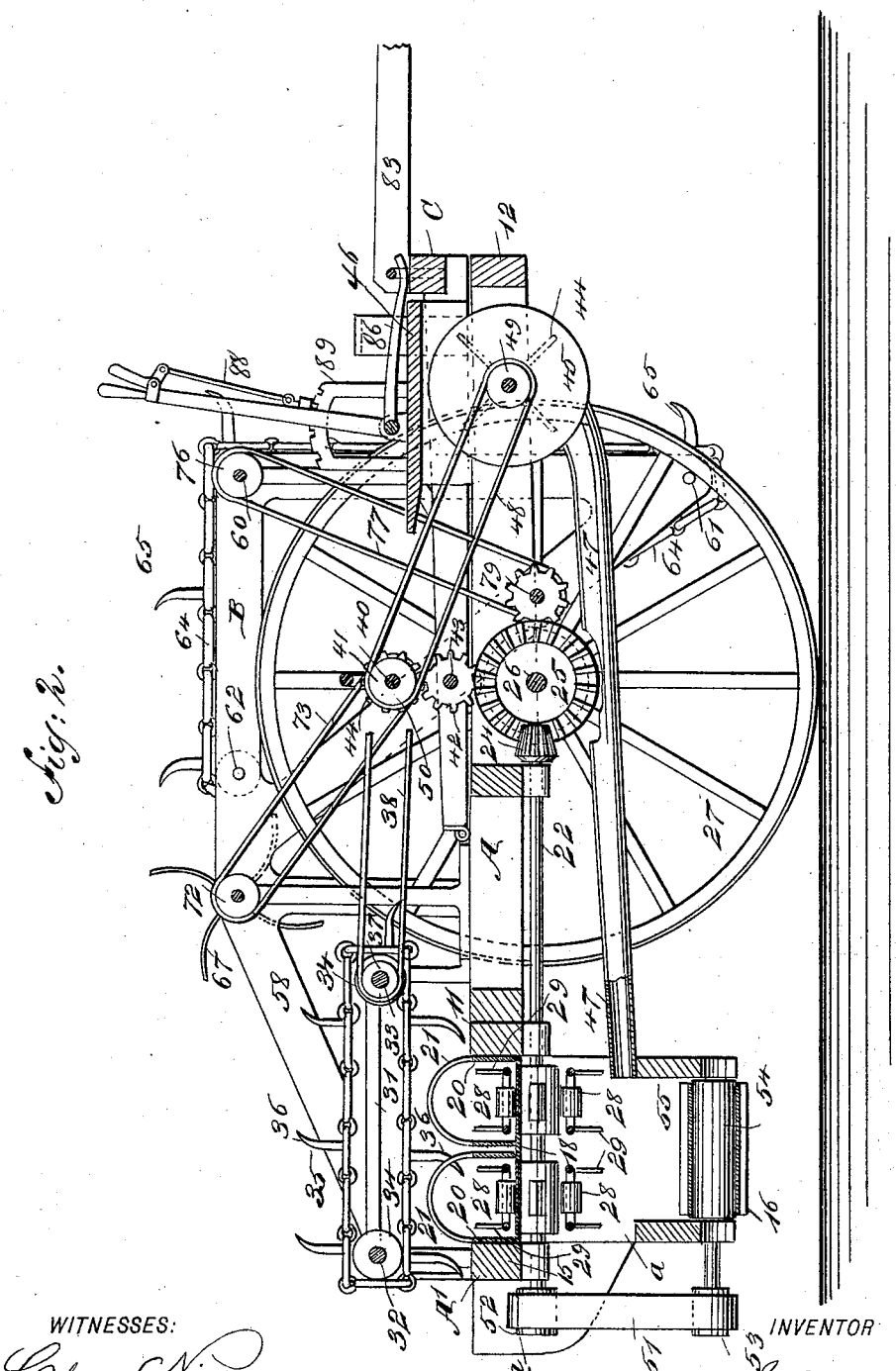
WITNESSES:
INVENTOR
BY
ATTORNEYS.

(No Model.) 4 Sheets—Sheet 3.
G. LEBLANC.
CORN HARVESTER AND HUSKER.
No. 539,774. Patented May 21, 1895.
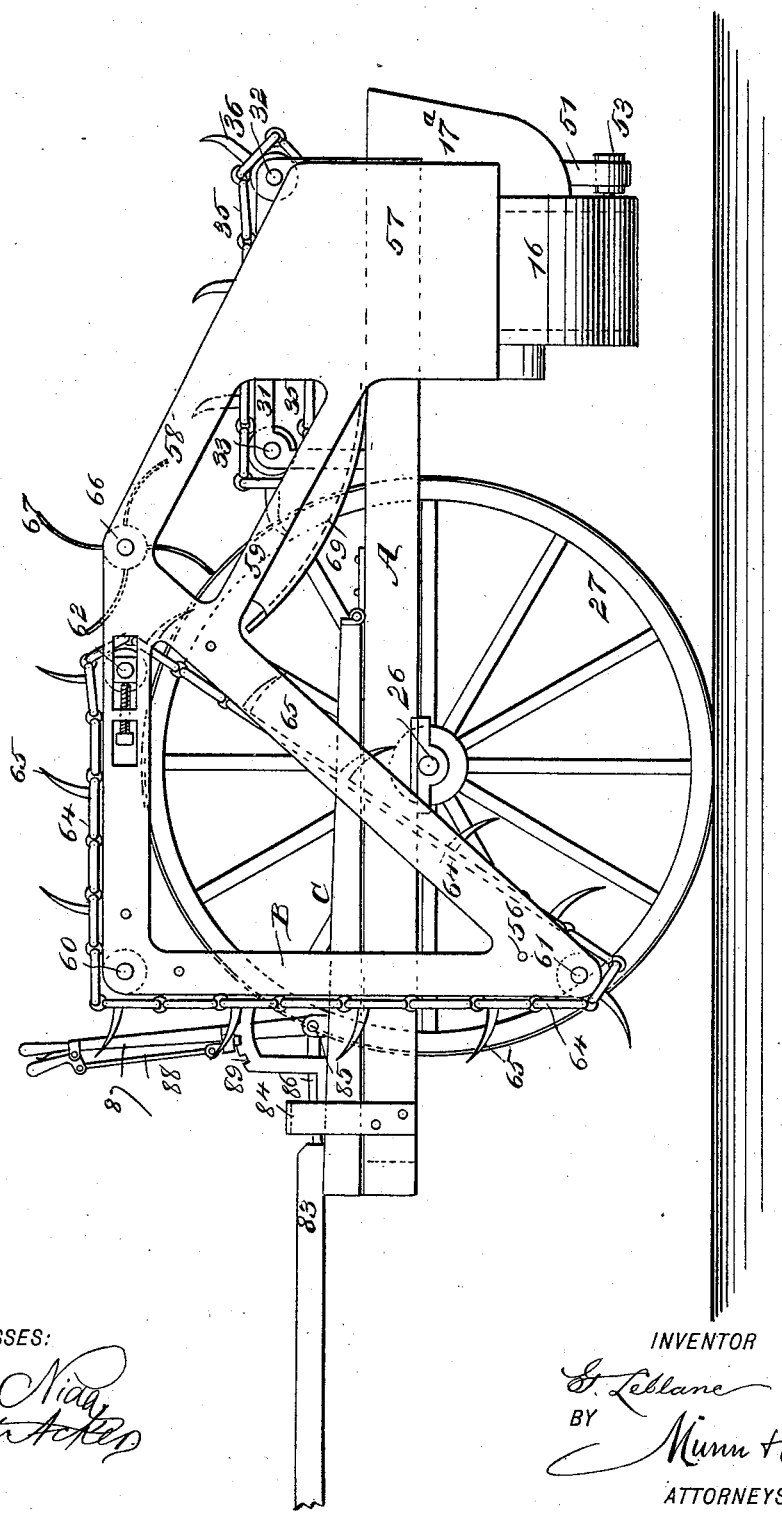
WITNESSES:
INVENTOR
G. Leblanc
BY
Munn & Co.
ATTORNEYS.

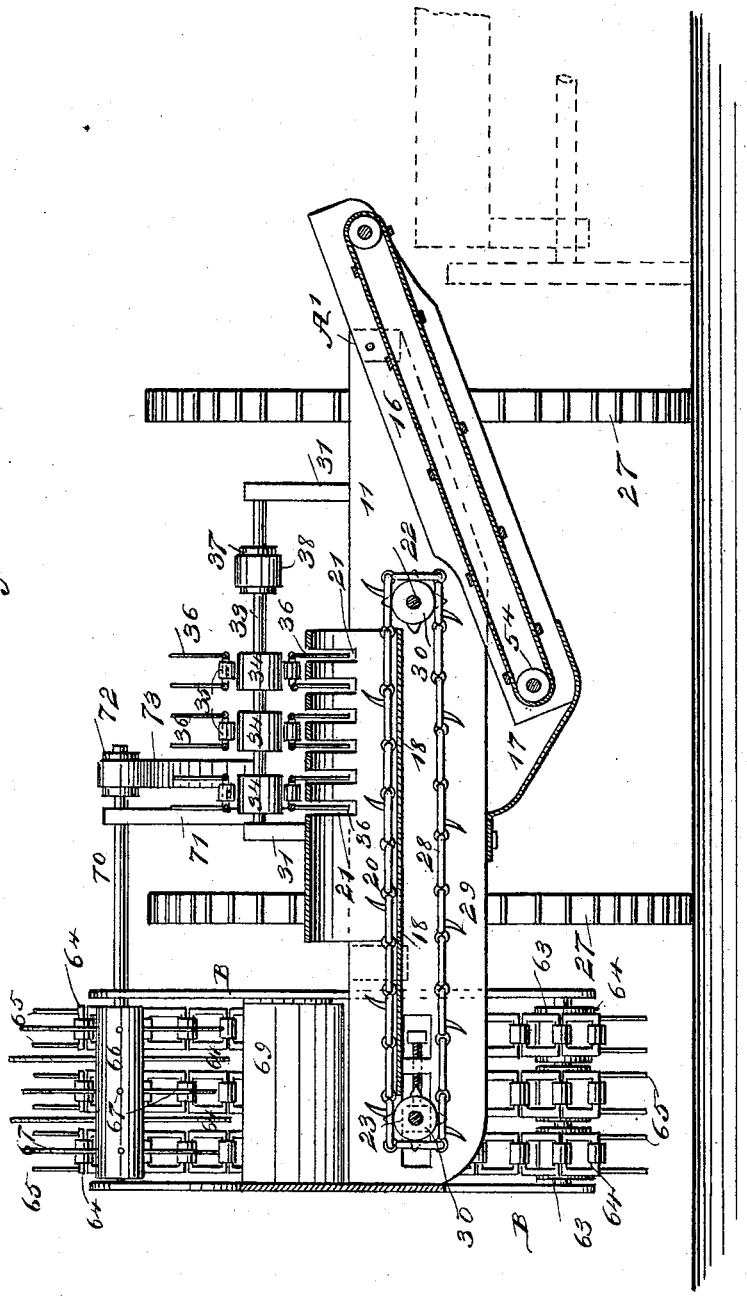

UNITED STATES PATENT OFFICE.

GUSTAVE LEBLANC, OF MEAD, NEBRASKA, ASSIGNOR OF ONE-THIRD TO W. J. LEHR, OF SAME PLACE.

CORN HARVESTER AND HUSKER.

SPECIFICATION forming part of Letters Patent No. 539,774, dated May 21, 1895.

Application filed June 11, 1894. Serial No. 514,178. (No model.)

*To all whom it may concern:*

Be it known that I, GUSTAVE LEBLANC, of Mead, in the county of Saunders and State of Nebraska, have invented a new and Improved Corn Harvester and Husker, of which the following is a full, clear, and exact description.

My invention relates to an improvement in corn huskers, and it has for its object to provide a machine adapted for field use, which will gather from one or more rows of standing or leaning corn stalks the ears of corn contained thereon, and which will further, as the machine is advanced, convey the ears to husking devices, and deliver the husked corn to an elevator by which it will be delivered into a wagon or other receptacle placed to receive said corn, the husks being discharged from the elevator to the ground, and any kernels of corn that may be loosened in the operation of husking will be conducted to the elevator and be delivered thereby with the ears.

A further object of the invention is to construct a machine of the above character in an exceedingly simple, durable and economic manner, and furthermore to so construct the machine that all of the driving mechanism will be driven from the axle, and the machine be capable of being drawn by a team placed at the front or at the rear as may be found most desirable in practice.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a plan view of the husker. Fig. 2 is a longitudinal section taken essentially on the line 2 2 of Fig. 1. Fig. 3 is a side elevation of the machine, and Fig. 4 is a transverse section taken essentially on the line 4 4 of Fig. 1.

In carrying out the invention the main frame A of the machine may be said to consist of side bars 10, a rear bar 11 and a front bar 12, together with intermediate longitudinally located bars 13, and an intermediate cross bar 14 connecting the beams or bars 13. To the rear end A' of the frame is secured a transverse beam 15 at a predetermined distance from the rear beam 11, the said transverse beam 15 being carried beyond the left-hand end of the said body beam 11. The space between the beam 15 and the rear beam 11 at the right-hand side of the machine is occupied by an elevator 16 of any approved construction, the elevator being attached at its upper end to the beams 11 and 15 near their right hand extremities, and the said elevator extending downward to such a degree that its lower end is considerably below the bottom of the frame.

The elevator 16 at its lower end is supported in a pocket 17, formed at the lower portion of the frame, the said pocket being carried upward in the form of a hopper 17$^a$, at the rear of the frame, as shown in Figs. 1 and 2; and an opening is produced in the pocket at the outer lower portion of the elevator, exposing the latter, as shown at $a$ in Fig. 2, in order that the husks and silk may escape from the elevator to the ground in a manner to be hereinafter set forth.

Between the beams 11 and 15 a bottom board or plate 18 is placed, said board or plate extending from the left-hand end a predetermined distance over the lower portion of the elevator and the pocket, as shown in Fig. 4; and the said bottom board or plate 18 is provided with a partition 19; and at the inner end of the said partition 19 two arches 20 are located, one at each side of the bottom 18, as shown in Figs. 1 and 2. These arches are preferably constructed of metal, and are provided with a series of openings or slots 21, produced in their side surfaces, as is most clearly shown in Fig. 4.

Near the right-hand extremity of the arches 20 a shaft 22, is journaled in the beam 15, the beam 11 of the main frame and likewise the cross beam 14 of the latter, as shown in Fig. 1, while a second and shorter shaft 23, is journaled below the bottom board 18 near the left-hand end thereof, the bearings of the shaft 23 being adjustable ones, as shown in Fig. 4.

The shaft 22 is driven by forming upon its inner end a beveled gear 24, which meshes with a beveled gear 25, forming a portion of a spur gear 25ᵃ, the two gears being fast upon an axle 26, said axle being journaled in the longitudinal beams of the main frame, and the axle carries two ground wheels 27, the said wheels being located between the outer beams 10 of the main frame and the inner longitudinal beams 13. The wheels 27, are in ratchet and dog connection with the axle 26, the dogs being usually pivoted upon the hubs of the ground wheel, and they are spring controlled and so engage with the ratchet wheels, which are located upon the axle, that when the machine is drawn forward the wheels will cause the axle to revolve, and when the machine is carried in a rearwardly direction the dogs slip over the ratchet wheels and the axle is silent. Each wheel has independent connection with the axle.

The shafts 22 and 23 are made to carry endless chain belts 28, preferably two in number, and these chain belts are provided with spurs 29, projecting outwardly from sundry of their links; and the said spurs are usually curved in direction of the travel of the belts. These belts are located one at each side of the partition 19, and one stretch passes over the bottom board 18, while the other is located beneath the said bottom, and each belt passes through one of the arches 20, it being understood that the bottom 18 at the left-hand side of the machine is cut away sufficiently to permit the return of the belts; and the belts are made to travel over sprocket wheels 30, firmly secured to the said shafts 22 and 23.

Transverse brackets 31, usually of U-pattern, are located partly on the frame, as shown in Fig. 1, one of the brackets being carried over the arches 20 near their left-hand ends, the other bracket being located in advance of the left-hand ends of said arches. A shaft 32, is journaled in the brackets over the rear portion of the frame, while in the forward portion of the brackets a second and parallel shaft 33 is journaled. Sprocket wheels 34, are located upon both of the shafts 32 and 33, and each longitudinally aligning pair of sprocket wheels is made to carry a chain belt 35, which belts may be termed stripping belts, since sundry of their links are provided with stripping spurs 36, curved at their outer ends and pointed at said ends, the concave faces of the stripping spurs being presented to the arches; and the spurs of each belt are preferably arranged in pairs, as shown in Fig. 4. The said spurs, as the belts revolve, are made to enter the arches 20 through the openings or slots therein, the action being substantially as follows: The ears of corn are delivered by mechanism to be hereinafter described to the left-hand or receiving end of the carrier belts 28, and are carried through the medium of the spurs 29 of said belts within the arches 20, and while in these arches the stripping spurs 30 of the belts 35 will tear or strip the husks and silk from the ears, and the husks together with the ears will drop down upon the elevator 16, and upon reaching the elevator the husks and silk will be blown from the ears and out from the elevator by means hereinafter described, and should any kernels be removed from the ears they will be caught in the pockets 17, so that nothing will be lost. The stripping belts 35, are likewise driven from the axle and in the following manner: A sprocket wheel 37, is located upon the forward shaft 33, and the said sprocket wheel is made to carry a chain belt 18, which is likewise passed over a sprocket wheel 39, located upon a shaft 40, journaled in bearings above the axle and supported by the main frame. The shaft 40, is provided with a pinion 41, which meshes with a pinion 42 upon a lower and parallel shaft 43, the pinion 42 being made to mesh with the gear 25ᵃ of the axle.

The dust, husks and silk are removed from the elevator and from among the husked ears primarily through the medium of a fan 44, which fan is held to revolve in a casing 45, located preferably in the forward portion of the main frame between the longitudinal beams 13, the said casing being provided with a platform 46, which may serve as a support for the driver; and the casing 45 has but one outlet, which is through the medium of a tube 47, which tube is led rearwardly, as shown in Fig. 2, and is carried over the inner side of the elevator at or near the bottom thereof. The fan is driven through the medium of a belt 48, which is passed over a pulley 49 located upon the fan shaft, and likewise over a pulley 50, located upon the upper shaft 40, as is also shown in Fig. 2. This belt may be either a plain belt or a chain belt.

The elevator is driven through the medium of a belt 51, which is passed over a pulley 52, located upon the extreme rear end of the driving shaft 22, which end projects beyond the end A' of the frame, the said belt 51 being then passed over a second pulley 53, located upon the outer end of the shaft upon which the lower drum 54 of the movable section or apron 55 of the elevator is mounted, as shown best in Fig. 2.

The gathering mechanism is located preferably at the left-hand side of the machine, and consists preferably of a substantially triangular frame B, which may be of skeleton construction, comprising two parallel essentially triangular plates connected by stay bolts 56 or their equivalents, the straight faces of the frame being the top and the front faces. The frame B at its upper end is connected with a housing 57 by connecting beams or bars 58 and 59, or a plate may be employed for the purpose. The housing 57 is open at the top, and surrounds the left-hand end of a portion of the rear surface of the frame, adjacent to that end.

A shaft 60, is journaled in the upper forward end of the gathering frame B, a second and parallel shaft 61 being journaled in the lower forward end, while at or near the upper rear end of the said frame a third shaft 62, is journaled, the latter shaft being in adjustable bearings. The shafts 60, 61 and 62, are each provided with a series of sprocket wheels 63, the sprocket wheels being of the same number on each of the shafts, and correspondingly located; and the corresponding sprocket wheel of each shaft is made to carry an endless chain or gathering belt 64, and the links of the said gathering belts are provided with spurs 65, arranged in pairs and projecting outwardly therefrom, the spurs being so arranged that upon the upper stretch of the belt they will be substantially in a horizontal position, curving slightly upward.

At the rear of the upper shaft 62 a drum 66 is journaled in the said gathering frame, the said drum being provided with a series of curved arms 67, the arms being so arranged as to enter between the pairs of gathering spurs 65 of the several gathering belts; and beneath the said drum a chute 69, is located, extending from one connecting bar 59 to the other, and from a point adjacent to the downward stretch of the gathering belts to a connection with the rear end of the frame delivering whatever it may receive upon the receiving ends of the conveying belts 28.

Thus in the operation of this machine, as the machine is drawn or pushed forward the stripping belts will be revolved and the stripping spurs or fingers 65 will gather and strip the ears of corn from the stalks of one, two or more rows, according to the number of belts employed, whether the stalks be standing straight or are inclined; and the said stripping and gathering fingers or spurs will carry the ears upward over the stripping frame, and the ears will be picked from the stripping fingers or spurs by the teeth 67 of the picking drum 66, and will be caused to fall upon the chute 69, by which they will be delivered to the conveying belts 28, and submitted to the action of the stripping belts, as has heretofore been stated.

The picking drum 66, is driven by projecting its shaft 70 inward to a bearing in the vertical hanger 71 located upon the main frame. A sprocket wheel 72, is secured upon the inner end of the shaft, and is connected by a chain belt 73 with a sprocket wheel 74, located upon the upper shaft 40, and the gathering belts are driven by projecting the upper forward shaft 60 inwardly over the main frame, journaling it in a hanger 75, and securing upon the inner end of this shaft a sprocket wheel 76, which is connected by a belt 77 with a sprocket wheel 78, located upon a shaft 79, journaled in suitable bearings forward of the axle 26, the shaft 79 being provided with a pinion 80, which meshes with the gear 25$^a$ on the axle.

A draft frame C, comprising a front bar 81 and side bars 82, is hinged at the rear end of its side bars upon the side bars 10 of the main frame; and when the machine is to be drawn the pole 83, is attached to the forward bar 81 of the said draft frame. The upward movement of the draft frame is limited by means of stops 84, or the equivalents thereof, and the elevation of the frame is accomplished through the medium of a rock shaft 85, journaled in suitable bearings upon the platform 46 at the front of the main frame, the said rock shaft being provided with a crank arm 86, which is connected with the front bar of the draft frame, and the said rock shaft is further provided with a hand lever 87, having the usual thumb latch 88, to engage with a rack 89. By raising or lowering the draft frame the picking fingers may be made to take the ears closer to or farther from the ground.

It is evident that a husker constructed as above set forth may be taken into a field and made to gather the ears of corn from any number of rows the machine may be built to operate upon; and that while the machine is in operation the husks and silk will be stripped from the ears, any loose kernels will be preserved, and the husks and silk will be blown from the machine, and the cleaned ears will be carried upward by the conveyer and delivered into a wagon traveling parallel with the machine, as shown in dotted lines in Fig. 4.

Having thus described my invention, I claim as new and desire to secure by Letters Patent—

1. In a corn harvester and husker, the combination with a wheeled support, and a gathering mechanism carried thereby, of a conveyer for receiving the ears of corn from the gathering mechanism, arches through which the conveyer passes, said arches being provided with transverse openings, and stripping belts arranged at right angles to the conveyer and provided with fingers projecting through the openings of the said arches, substantially as and for the purpose set forth.

2. In a corn husker, a husking mechanism, the same consisting of transversely slotted arches, belts held to revolve over said arches, and stripping fingers or spurs attached to the belts and adapted to enter the said arches through the slots therein, substantially as shown and described.

GUSTAVE LEBLANC.

Witnesses:
M. NEWMAN,
W. J. LEHR.